Figure 1:
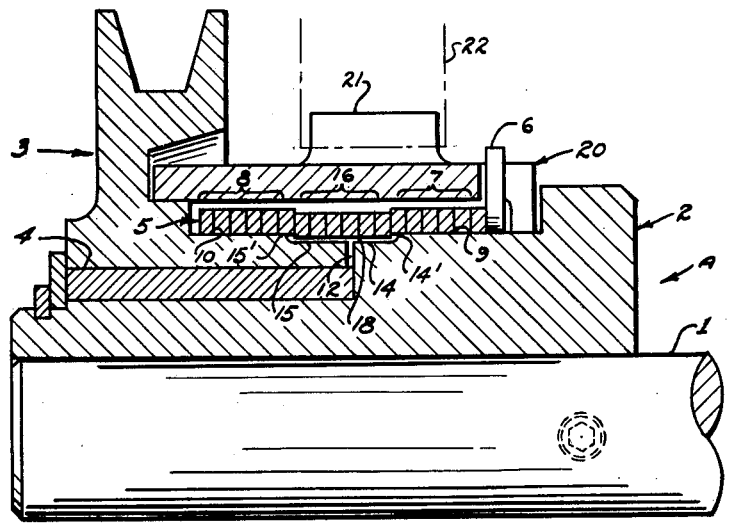

April 14, 1964  D. R. TOMKO  3,128,863

SPRING CLUTCH MECHANISMS

Filed Sept. 2, 1959

INVENTOR.
DONALD R. TOMKO
BY *George M. Soule*
ATTORNEY

United States Patent Office 3,128,863
Patented Apr. 14, 1964

3,128,863
SPRING CLUTCH MECHANISMS
Donald R. Tomko, Cleveland, Ohio, assignor to Curtiss-Wright Corporation, a corporation of Delaware
Filed Sept. 2, 1959, Ser. No. 837,688
1 Claim. (Cl. 192—81)

This invention relates to a normally engaged or self-energizing type of helical friction coil clutch mechanism for connecting a continuously rotating drive or input shaft or member to a load via a suitable output shaft or member and permitting the output shaft or member to become arrested simply by stopping the input end of the clutch spring by a suitable cooperating abutment or a brake. In order to permit overrun of the load during disconnect operations, the clutch spring has to be full floating on each of two coaxial input and output drum members of the clutch mechanism (i.e. the spring being doubly full floating in having two "free" end coil portions unconnected with the associated clutch drums except by friction). Thus during dis-connect periods the output drum and connected load can coast to a stop by overrunning the associated coils of the arrested clutch spring, and the input drum can continue to rotate while overrunning the arrested spring.

When such a clutch mechanism as outlined above is arranged to drive a load having low inertia and/or low friction the mechanism is inherently subject to chatter and premature wear during the disconnect periods because the input-drum-associated coils of the clutch spring will not, in the absence of special provision to maintain those coils completely out of contact with the continuously rotating input drum, be prevented from intermittently or spasmodically gripping the two clutch drums with sufficient force to energize the spring and cause chatter.

One solution to the chatter and wear problem under circumstances such as discussed above forms the subject of a prior application of C. R. Sacchini and D. R. Tomko, Serial No. 637,239, filed January 30, 1957, entitled Spring Clutch Mechanism, now Patent 2,968,380. A more complete analysis of the problem than needs to be given herein appears in that patent.

Another proposed solution is to provide a conical input clutch drum so related to the output drum and spring at the crossover region (hereinafter "crossover") between the two drums, that, despite the existence of continual overrunning contact between one or more free end coils of the spring and the input drum during disconnect periods, the involved frictional overrunning drag will be insufficient to cause coil portions of the spring associated with the input drum at and close to the crossover region spasmodically to grip the input drum and cause chatter. That proposed solution has, inter alia, the disadvantage of necessitating a diametral step between the clutch drums directly adjacent the crossover. Such a step subjects the highest load carrying or crossover coil of the clutch spring to destructive twisting forces, particularly during re-engagement of the clutch after idle periods. There are other disadvantages well known to those skilled in the art in having to provide a diametral step directly at the crossover.

The clutch according to the present invention eliminates chatter for basically the same reasons as given above in connection with the use of a conical input drum, but avoids subjecting the clutch spring and associated drum surfaces to forces and conditions tending to shorten the useful life of the clutch.

In the accompanying drawing FIG. 1 is a longitudinal sectional view through one side only of a spring clutch unit A similar to that of the above mentioned patent and with the clutch disengaged.

Figure 2:
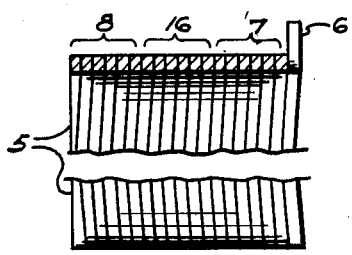

FIG. 2 is principally an axial cross sectional view of the clutch spring of FIG. 1 in a relaxed or normal state.

In FIG. 1, showing the essentials of present clutch unit or assembly A, a drive shaft 1, partially shown, is assumed to be permanently connected to a continuously operating drive means such as an output element of an electric motor; and an input drum member 2 rigid with the shaft 1, supports the output drum member 3 at a suitable bearing such as a sleeve or bushing 4. Output drum member 3 may be a hub portion of a pulley or can be otherwise permanently coupled with a load, not shown.

Helical clutch spring 5, in the FIG. 1 illustrated form of the present invention, is basically a cylindrical helical coil member as shown in FIG. 2 except for its having a control element such as a radial toe 6 at the free end associated with the input drum member 2. For self energization of the spring 5 (and overrunning operation as already described) several free end coils at each end of the spring (group of input end coils 7 and group of similar coils 8) are elastically preloaded on or in interference fitting relation to generally cylindrical drum surface portions 9 and 10 respectively of drum members 2 and 3. The preloading of coils 7 is usually the same as of coils 8. At each side of the conventional crossover gap 12 the drum members, as shown, have basically cylindrical surface portions 14 and 15 of substantially equal diameter defined in part by step surfaces 14' and 15' of respective drum members 2 and 3 (height of steps exaggerated as shown) located remotely of the crossover 12, preferably by two or three spring coil widths axially of the clutch assembly. A conventional crossover gap is one defined by an axial separation of the clutch drums a distance materially less than the width of the individual spring coils measured axially of the drums. Coils of an intermediate group 16 are shown in relaxed or normal state, i.e. with their inner diameter or gripping surface portions radially spaced from the reduced diameter drum surface portions 14 and 15. The radial spacing or clearance 18 can be very small depending upon the index of the spring stock and the amount or degree of energizing preloading as of input end coils 7 on drum surface 9. The design is such that the overrunning torque exerted by the input drum surface 9 on coils 7 when the spring is arrested for disconnection of the clutch, will be less than required to overcome the spring moment of the intermediate coils 16 to the extent of seating those coils on the drums at the crossover region. The overrunning torque just mentioned normally has constant value (subject to variations only due to manufacturing tolerance variations), and advantageously the clearance 18 is by design no greater than will insure that the overrunning torque shall be less than required to contract and seat the intermediate coils 16 on the crossover-associated drum surfaces.

Any suitable means can be employed to control (i.e. arrest and release) the clutch spring 5. As shown in FIG. 1, a control sleeve 20 around the drum members 2 and 3 is operatingly attached to the toe 6 of the spring and has one or more circumferential abutments such as 21 engageable as by a stop 22 movable into and out of the path of rotation of the abutment or abutments 21. The control sleeve 20 is suitably supported on the drum members 1 and 3 so that the drum members can turn independently of the control sleeve while the clutch A is disengaged. When the control sleeve 20 is released, the intermediate coils 16 are caused by the energizing torque of the free end coil portions 7 and 8 to be seated on the crossover-associated surfaces 14 and 15; and, since the clutching pressures exerted by coils of the spring 5 remotely of the crossover 12 are small relative to the pressures exerted by the crossover coil, any local twisting force exerted on the spring at the step shoulders 14' and 15' are inconsequential. Assuming the shoulders 14' and 15' are of approximately the same radial height, as is preferable, the presence of the shoulders does not give rise to a tendency for the spring 5 to crawl out of position along the axis of the clutch A, whereas a single shoulder or step directly at the crossover would give the spring a tendency to move out of position toward the drum having the smaller diameter at the crossover.

The arrangement according to FIG. 1, in addition to enabling a simple basically cylindrical spring construction has the advantage namely that the endmost ones of the relaxed intermediate coils 16 tend, in cooperation with the shoulders 14' and 15', to hold the clutch spring 5 in position axially. Thereby no other axial positioning means such as the illustrated shoulders on the control sleeve 20 and the drum member 3 have to be provided or at least critically positioned relative to the axial dimensions of the clutch spring.

I claim:

A friction coil clutch comprising an input clutch drum adapted to be continuously driven unidirectionally, an output clutch drum coaxial therewith, a helical clutch spring having end coils preloaded radially against respective drums for self-energization thereon and gripping connection therewith, the input-drum-associated coils being otherwise unconnected with the input drum, control means associated with an input-drum-associated end coil portion of the spring and operable to arrest rotation of the spring and disengage the clutch, the relatively axially adjacent peripheral surface portions of the clutch drums being substantially of equal diameters and defining a crossover region between the drums and a crossover gap of less width axially of the drums than the axial thickness of the individual spring coils, and the clutch spring having intermediate coil portions between its preloaded end coils disposed during disengagement of the clutch in sufficiently radially spaced relation to both crossover-defining drum surface portions so that overrunning torque incident to the preloading of end coils of the spring on the input drum is insufficient to deflect the intermediate coils into contact with the crossover-defining drum surface portions, the clutch spring, in a relaxed state thereof, being basically cylindrical and both clutch drums being stepped in regions remotely of the crossover region sufficiently to maintain substantial clearance between the drum surface portions of the two drums which define the crossover region and the associated spring coils during disengagement of the clutch.

References Cited in the file of this patent
UNITED STATES PATENTS

| | | |
|---|---|---|
| 1,836,199 | Starkey | Dec. 15, 1931 |
| 2,481,248 | Schneider et al. | Sept. 6, 1949 |
| 2,510,653 | Pepper | June 6, 1950 |
| 2,626,029 | Gutterman | Jan. 20, 1953 |
| 2,685,949 | Dunlap | Aug. 10, 1954 |
| 2,878,914 | Worst | Mar. 24, 1959 |